US012566488B2

(12) United States Patent
Tanaami et al.

(10) Patent No.: US 12,566,488 B2
(45) Date of Patent: Mar. 3, 2026

(54) INTERFACE APPARATUS AND BOARD SPORT EXPERIENCE SYSTEM

(71) Applicant: SINTOKOGIO, LTD., Nagoya (JP)

(72) Inventors: Yoshikane Tanaami, Nagoya (JP); Miyuki Hayashi, Nagoya (JP)

(73) Assignee: SINTOKOGIO, LTD., Aichi (JP)

( * ) Notice: Subject to any disclaimer, the term of this patent is extended or adjusted under 35 U.S.C. 154(b) by 0 days.

(21) Appl. No.: 18/664,735

(22) Filed: May 15, 2024

(65) Prior Publication Data

US 2024/0393864 A1     Nov. 28, 2024

(30) Foreign Application Priority Data

May 26, 2023     (JP) ................................. 2023-087221

(51) Int. Cl.
| | |
|---|---|
| *G06F 3/01* | (2006.01) |
| *A63F 13/245* | (2014.01) |
| *A63F 13/57* | (2014.01) |
| *A63F 13/807* | (2014.01) |

(52) U.S. Cl.
CPC ............ *G06F 3/011* (2013.01); *A63F 13/245* (2014.09); *A63F 13/57* (2014.09); *A63F 13/807* (2014.09); *G06F 3/016* (2013.01)

(58) Field of Classification Search
None
See application file for complete search history.

(56) References Cited

U.S. PATENT DOCUMENTS

| | | | |
|---|---|---|---|
| 2002/0016204 A1 | 2/2002 | Kanno et al. | |
| 2002/0094867 A1 | 7/2002 | Kanno et al. | |
| 2019/0184227 A1* | 6/2019 | Gouzenko | G06F 1/1694 |
| 2020/0097088 A1* | 3/2020 | Welch | A63F 13/28 |
| 2021/0346755 A1* | 11/2021 | Epstein | F16C 19/20 |

FOREIGN PATENT DOCUMENTS

JP          H10225573 A          8/1998

* cited by examiner

Primary Examiner — Stephen T. Reed
(74) Attorney, Agent, or Firm — Harness, Dickey & Pierce, P.L.C.

(57)          ABSTRACT

An interface apparatus for providing a user with a board sport experience in a virtual space includes: a board on which the user is to board; a tilt mechanism that supports the board from below such that the board is tiltable; a force sensor that is provided to the board or the tilt mechanism and that detects a force and a moment which are applied from the user to the board; and an input and output section that provides a signal indicative of the force and the moment to a simulation apparatus configured to generate the virtual space and that acquires, from the simulation apparatus, a control signal for controlling the tilt mechanism so as to tilt the board.

5 Claims, 3 Drawing Sheets

INTERFACE APPARATUS AND BOARD SPORT EXPERIENCE SYSTEM

This Nonprovisional application claims priority under 35 U.S.C. § 119 on Patent Application No. 2023-087221 filed in Japan on May 26, 2023, the entire contents of which are hereby incorporated by reference.

TECHNICAL FIELD

The present invention relates to an interface apparatus and a board sport experience system.

BACKGROUND ART

Conventionally, an input apparatus for a game designed to resemble a board sport, such as skateboarding, as disclosed in Patent Literature 1 has been known. The input apparatus includes a board part on which a player is to board by both feet and a support mechanism supporting the board part such that the board part can oscillate. The input apparatus provides a game machine with oscillation information obtained when the player causes the board part to oscillate. In the support mechanism, the central axis of movement of the oscillation is positioned at a lower part of or below the board part.

CITATION LIST

Patent Literature

[Patent Literature 1]
Japanese Patent Application Publication, Tokukaihei, No. 10-225573

SUMMARY OF INVENTION

Technical Problem

Recently, virtual space (metaverse) technologies have been actively developed. Applying such a virtual space technology to a game designed to resemble a board sport as above makes it possible to provide users with realistic feeling as if they actually experienced the board sport. However, a conventional input apparatus as disclosed in Patent Literature 1 has merely functioned as a controller that only transmits, in a unilateral way, a control signal from the input apparatus to a simulation apparatus configured to generate a virtual space, in order to move a character and a board on the screen. Thus, merely using the conventional apparatus in a board sport in a virtual space provides an insufficiently realistic movement of the board and thus only provides an experience far from an experience in a real board sport.

An aspect of the present invention has been achieved in light of the foregoing problem. It is an object of the aspect of the present invention to enable users to experience a more realistic movement of a board in a board sport in a virtual space.

Solution to Problem

A real board sport typically involves motion of a board. Thus, the board oscillates in accordance with change in a state of a road surface or the like as well as oscillates in accordance with, for example, operation by a user and shifting of a weight of the user. The inventors have found that making it possible to experience oscillation in accordance with such change in a state of a road surface or the like improves reality of the board sport experience in a virtual space, and have achieved the present invention.

In order to solve the foregoing problem, an interface apparatus in accordance with an aspect of the present invention is an interface apparatus configured to provide a user with a board sport experience in a virtual space, the interface apparatus including: a board on which a user is to board; a tilt mechanism which supports the board from below such that the board is tiltable; a force sensor that is provided to the board or the tilt mechanism and that detects a force and a moment which are applied from the user to the board; and an input and output section that provides a signal indicative of the force and the moment to a simulation apparatus configured to generate the virtual space and that acquires, from the simulation apparatus, a control signal for controlling the tilt mechanism so as to tilt the board.

Further, in order to solve the foregoing problem, a board sport experience system in accordance with another aspect of the present invention includes: the interface apparatus; and the simulation apparatus, the simulation apparatus determining a tilt direction of the board and a tilt angle of the board in view of a state of the virtual space and a posture of the user which posture has been specified by the force and the moment.

Advantageous Effects of Invention

Each aspect of the present invention enables users to experience a more realistic movement of a board in a board sport in a virtual space.

DESCRIPTION OF EMBODIMENTS

The following description will discuss an embodiment of the present invention in detail with reference to the drawings.

<Configuration of Board Sport Experience System>

Figure 1:
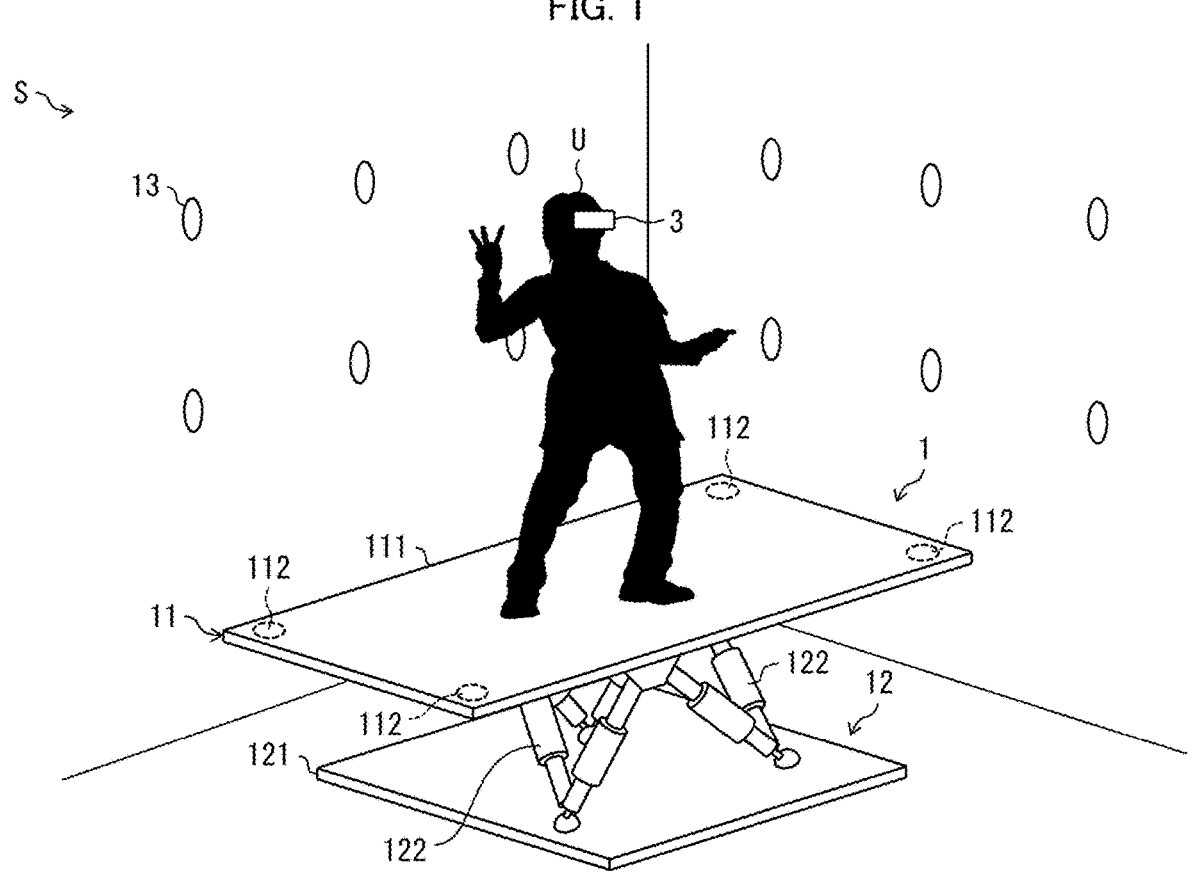
FIG. 1 is a perspective view illustrating an example of a board sport experience system in accordance with an embodiment of the present invention.
Figure 2:
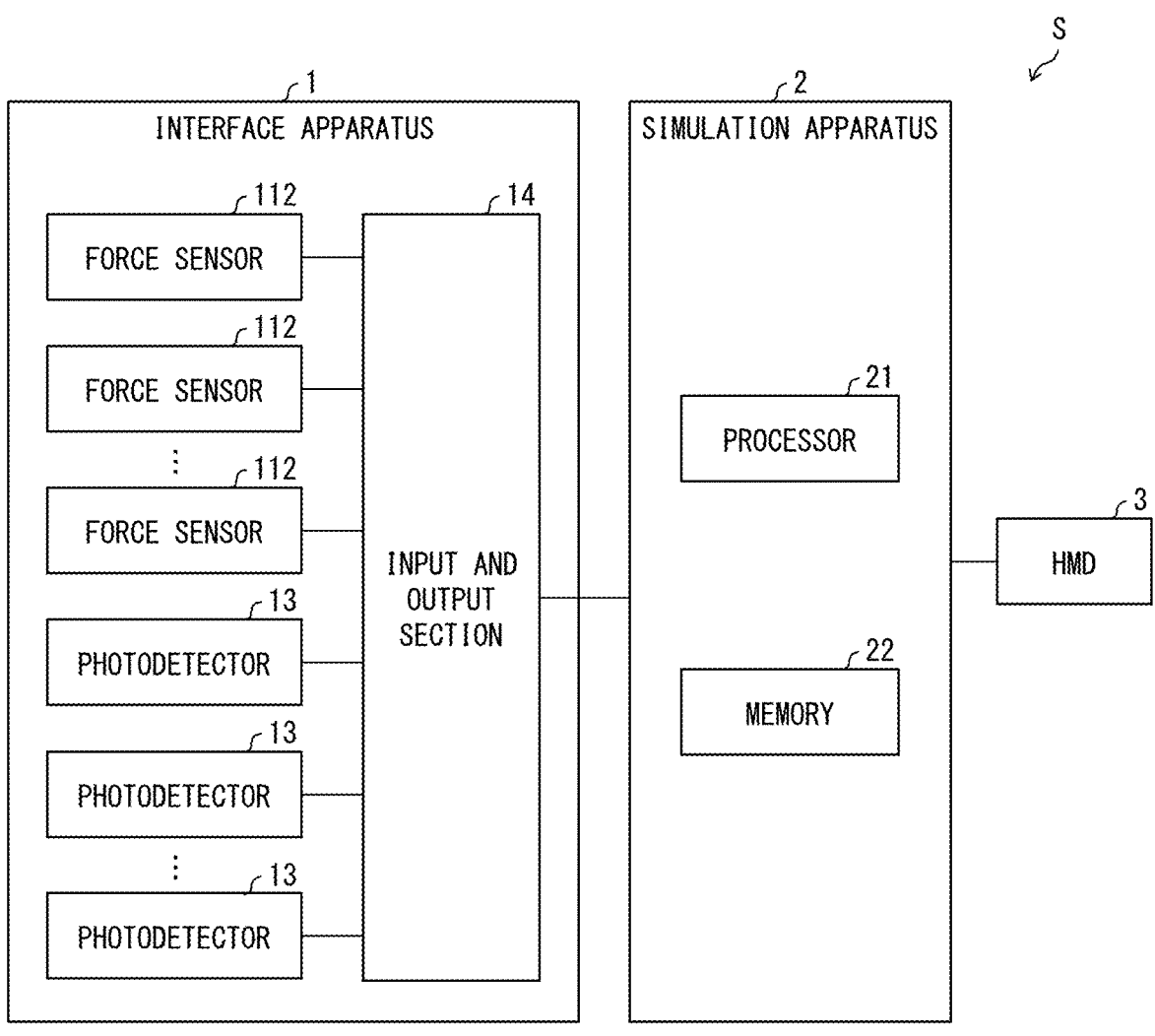
FIG. 2 is a block diagram illustrating an electrical configuration of the system.

A board sport experience system in accordance with the present embodiment (hereinafter, referred to as "system S") provides a user U with a board sport experience in a virtual space. The term "board sport" refers to any of overall sports in which a user U boards on a board. Examples of the board sport include surfing, snowboarding, and skateboarding. As illustrated in FIGS. 1 and 2, the system S includes an interface apparatus 1, a simulation apparatus 2, and a head mounted display 3 (hereinafter, referred to as "HMD 3"). As illustrated in FIG. 2, the components 1 to 3 are communicably connected with each other in a wired or wireless manner. Note that the system S may include a plurality of interface apparatuses 1 and a plurality of HMDs 3. In this case, the plurality of interface apparatuses 1 may be installed in the same room or may be installed in different rooms.

[Interface Apparatus]

The interface apparatus 1 provides a user U with a board sport experience in a virtual space. As illustrated in FIG. 1, the interface apparatus 1 includes a force plate 11 and a tilt mechanism 12. As illustrated in FIGS. 1 and 2, the interface apparatus 1 in accordance with the present embodiment further includes a plurality of photodetectors 13 and an input and output section 14.

[Tilt Mechanism]

As illustrated in FIG. 1, the tilt mechanism 12 supports the force plate 11 from below such that the force plate 11 is tiltable. The tilt mechanism 12 in accordance with the present embodiment is a parallel link mechanism.

The tilt mechanism 12 includes a base 121 fixed to the floor surface and a plurality of movable links 122.

(Movable Link)

The plurality of movable links 122 have lower end portions each coupled to a peripheral portion of the base 121. The lower end portions are movable joints (for example, ball joints). Therefore, the movable links 122 can each tilt with the lower end portion as a fulcrum thereof. Further, each of the movable links 122 is constituted by a piston and a cylinder. Thus, each of the movable links 122 can expand and contract such that the lower end portion and the upper end portion thereof move closer to and away from each other. Furthermore, as in the case of the lower end portions, the upper end portions of the plurality of movable links 122 are movable joints.

Note that the tilt mechanism 12 is not limited to the above configuration. For example, each of the movable links of the tilt mechanism may be configured to be able to be bent and straightened. In addition, the force plate 11 may be configured to be tilted by adjusting a bending angle of each of the lower end portions of the movable links through, for example, power of a motor. Alternatively, the tilt mechanism may be configured such that the lower end portions of the movable links each having a bar shape are movable along an upper surface of the base 121, and further the force plate 11 is tilted by causing the upper end portions of the movable links to move upward and downward by the movement of the lower end portions of the movable links.

[Force Plate]

The force plate 11 is provided on the tilt mechanism 12. The force plate 11 includes a board 111 and at least one force sensor 112. That is, the at least one force sensor 112 in accordance with the present embodiment is provided to the board 111. In addition, the force plate 11 in accordance with the present embodiment includes a plurality of force sensors 112.

(Board)

On the board 111, the user U is to board. The upper surface of the board is a boarding surface on which the user U is to board. The board 111 in accordance with the present embodiment has a rectangular shape when seen in plan view. Note that the shape of the board when seen in plan view may be any shape suited to the board sport experience provided by the system S.

(Force Sensor)

The force sensors 112 each detect a force and a moment which are applied from the user U to the force plate 11. The plurality of force sensors 112 in accordance with the present embodiment are three-axis force sensors and are built in the respective four corners of the board 111. The force sensors 112 each repeatedly detect, at a predetermined cycle, the force and the moment which act on the board 111. Note that the force sensors 112 may be attached to the surface of the board 111 instead of being built in the board 111 (may not constitute the force plate) or may be provided to the tilt mechanism 12. In addition, the force sensors 112 may be six-axis force sensors.

The force plate 11 configured as above measures a force (floor reaction force) that occurs through interaction between the board 111 and the user U on the board 111. Specifically, the force plate 11 detects thrust forces in three axial directions (Fx, Fy, Fz) which act on the boarding surface of the board 111 when the user U moves on the board 111. On the basis of the detection result, for example, a center of pressure (COP) on the boarding surface, a moment (free moment) that occurs, due to friction, about a Z axis passing the COP in a vertical direction, and a center of gravity sway are calculated. By doing so, the force plate 11 or the simulation apparatus 2 described later can specify, for example, a posture of the user U, how the weight of the user U is applied, and in which direction the user U tries to direct the board.

A peripheral portion of the lower surface of the force plate 11 is coupled with each of the upper end portions of the plurality of movable links 122. The force plate 11 is tilted in accordance with a degree of expansion and contraction of each of the movable links 122.

[Photodetector]

The photodetectors 13 detect light emitted from the HMD 3 described later. The plurality of photodetectors 13 are provided so as to surround the interface apparatus 1. The photodetectors 13 in accordance with the present embodiment are provided on the walls of a room in which the interface apparatus 1 is installed. In addition, the photodetectors 13 in accordance with the present embodiment are provided in a matrix at a predetermined interval. Note that, for example, the photodetectors 13 may be provided so as to be obliquely aligned or may be provided randomly.

[Input and Output Section]

The input and output section 14 provides a detection signal to a simulation apparatus 2. The detection signal indicates the force and the moment. In addition, the input and output section 14 acquires, from the simulation apparatus 2, a control signal for controlling the tilt mechanism 12 so as to tilt the force plate 11. The input and output section 14 is constituted by a communication module that communicates with the simulation apparatus 2 in a wired or wireless manner or a terminal for wired connection with the simulation apparatus 2.

The input and output section 14 in accordance with the present embodiment provides the simulation apparatus 2 with identification information (for example, ID and attachment position) of the photodetector 13 that has detected the light emitted by the HMD 3.

[Simulation Apparatus]

The simulation apparatus 2 generates a virtual space. In a case where the board sport experience provided by the system S is a surfing experience, the virtual space is designed to resemble a space above the ocean. In a case of a snowboarding experience, the virtual space is designed to resemble a space above snow. In a case of a skateboarding experience, the virtual space is designed to resemble a space on a road or the like. As illustrated in FIG. 2, the simulation apparatus 2 includes a processor 21 and a memory 22.

(Memory)

The memory 22 stores a control program for causing the simulation apparatus 2 to operate. The memory 22 in accordance with the present embodiment also stores image data for generating the virtual space.

(Processor)

The processor 21 generates a virtual reality (VR) image designed to resemble a virtual space (for example, the ocean, a snow mountain, a skateboard park, or the like) depending on a board sport experience provided by the system S. The processor 21 generates the VR image on the basis of graphics data obtained by taking a picture of a place to actually experience the board sport. In addition, the processor 21 generates an image of a virtual space in which the surface below the force plate 11 and the surrounding scenery are moving backward (which provides feeling as if the user U was moving forward). In addition, the processor 21 in accordance with the present embodiment specifies an orientation of the face of the user U on the basis of the identification information of the photodetector 13 that has detected the light and causes the virtual space to rotate in accordance with the orientation of the face of the user U. The processor 21 then transmits, to the HMD 3, data on the virtual space generated, via a communication module which is not illustrated.

The processor 21 in accordance with the present embodiment generates data on minute vibration that occurs when the board moves. In a case where the board sport experience provided by the system S is a surfing experience, the vibration includes a vibration that occurs when a tip portion of a board pushes through waves. In a case of a snowboarding experience, the vibration includes a vibration that occurs when a snowboard rubs against a snow surface. In a case of a skateboarding experience, the vibration includes a vibration that occurs when the wheels of a skateboard roll on a road surface. The processor 21 transmits, to the interface apparatus 1, data on the vibration generated, via the communication module.

In addition, the processor 21 determines a direction in which the force plate 11 is tilted and an angle at which the force plate 11 is tilted, on the basis of a state of the virtual space and a posture of the user U which has been specified by the force and the moment. The expression "state of a virtual space" refers to a state of at least a surface located below the force plate 11, in the virtual space. In a case where the board sport experience provided by the system S is a surfing experience, the state of the virtual space refers to a state of an ocean surface. In a case of a snowboarding experience, the state of the virtual space refers to a state of a snow surface. In a case of a skateboarding experience, the state of the virtual space refers to a road surface. The "state" refers to, for example, the presence or absence of irregularity (in a case of the ocean surface, the presence or absence of a wave), a depth of a recess, a height of a protrusion, tilt of a surface leading to the bottom of the recess or the vertex of the protrusion. The processor 21 repeatedly detects, at a predetermined cycle, a force and a moment that act on the board 111. Thus, in accordance with a temporal change in a state of the virtual space (movement of a surface below the force plate 11 and the scenery in the virtual space), the processor 21 determines the tilt direction and the tilt angle each of which differs accordingly.

Note that, for example, the processor 21 may be alternatively configured to acquire data on an image which has been taken by a wearable camera worn by an athlete and which captures the athlete actually performing the board sport and to prepare the VR image on the basis of the data. Such a configuration enables the user U to feel as if the user U experienced the high-level board sport performed by the athlete. Alternatively, the processor 21 may be configured to acquire data on an image which has been taken at a distance from an athlete and which captures the athlete actually performing the board sport and to generate a virtual space on the basis of the data. Such a configuration provides the user U with feeling as if the user U performed the board sport side by side with the athlete and thus adds charm to the experience.

In addition, in a case where a plurality of interface apparatuses 1 and a plurality of HMDs 3 are connected with the processor 21, the processor 21 may be configured to generate, as a virtual space to be provided to each HMD, a virtual space showing an avatar of a user other than a user wearing the HMD. For example, when first and second users who wear their respective HMDs 3 experience a board sport with use of different interface apparatuses 1, the HMD 3 of the first user (second user) is provided with data on the virtual space showing an avatar of the second user (an avatar of the first user). This enables a plurality of users to enjoy a board sport together in the virtual space and showcase skills of the board sport in competition in the virtual space. If the number of the users increases, it is possible to hold a competition offering a cash reward in the virtual space.

Alternatively, the processor 21 may be configured to generate a virtual space other than a VR image and an avatar of the user U present in the virtual space. In this case, the processor 21 may be configured to change a posture of the avatar on the basis of the state of the virtual space and the posture of the user U.

In addition, the processor 21 may be configured to generate a sound in the virtual space and transmits the sound to the HMD 3. In a case where the board sport experience provided by the system S is a surfing experience, the sound includes a sound of a wave. In a case of a snowboarding experience, the sound includes a sound that occurs when a snowboard rubs against a snow surface. In a case of a skateboarding experience, the sound includes a sound that occurs when the wheels of a skateboard roll on a road surface.

[Head Mounted Display]

The HMD 3 displays an image which represents the virtual space and which has been acquired from the simulation apparatus 2. Further, the HMD 3 is worn on the head of the user U when the user U boards on the force plate 11. This makes it possible to provide the user U with realistic feeling as if the user U existed in the virtual space. The simulation apparatus 2 in accordance with the present embodiment generates a VR image and thus enables the user U wearing the HMD 3 to feel as if the user U existed in a more realistic virtual space. In addition, the simulation apparatus 2 in accordance with the present embodiment generates an image of a virtual space in which the surrounding scenery is moving backward and thus enables the user U wearing the HMD 3 to feel as if the user U was moving forward.

At least while the user U experiences the board sport, the HMD 3 in accordance with the present embodiment emits light in a direction in which the user U's face is oriented. The light needs only differ from light in the interior of the room in which the interface apparatus 1 is installed and may be, for example, visible light or infrared light. The light emitted from the HMD 3 is detected by any of the plurality of photodetectors 13 provided around the interface apparatus 1.

Note that the HMD 3 may contain a speaker. In this case, the HMD 3 may be configured to output a sound in the virtual space which has been acquired from the simulation apparatus 2.

<Operation of Board Sport Experience System (Interface Apparatus)>

The system S configured as above starts its operation when a predetermined start condition is satisfied. Examples of the start condition include the followings: the system S (interface apparatus 1) is turned on; the user U boards on the force plate 11; and the user U performs a predetermined start operation.

Figure 3:
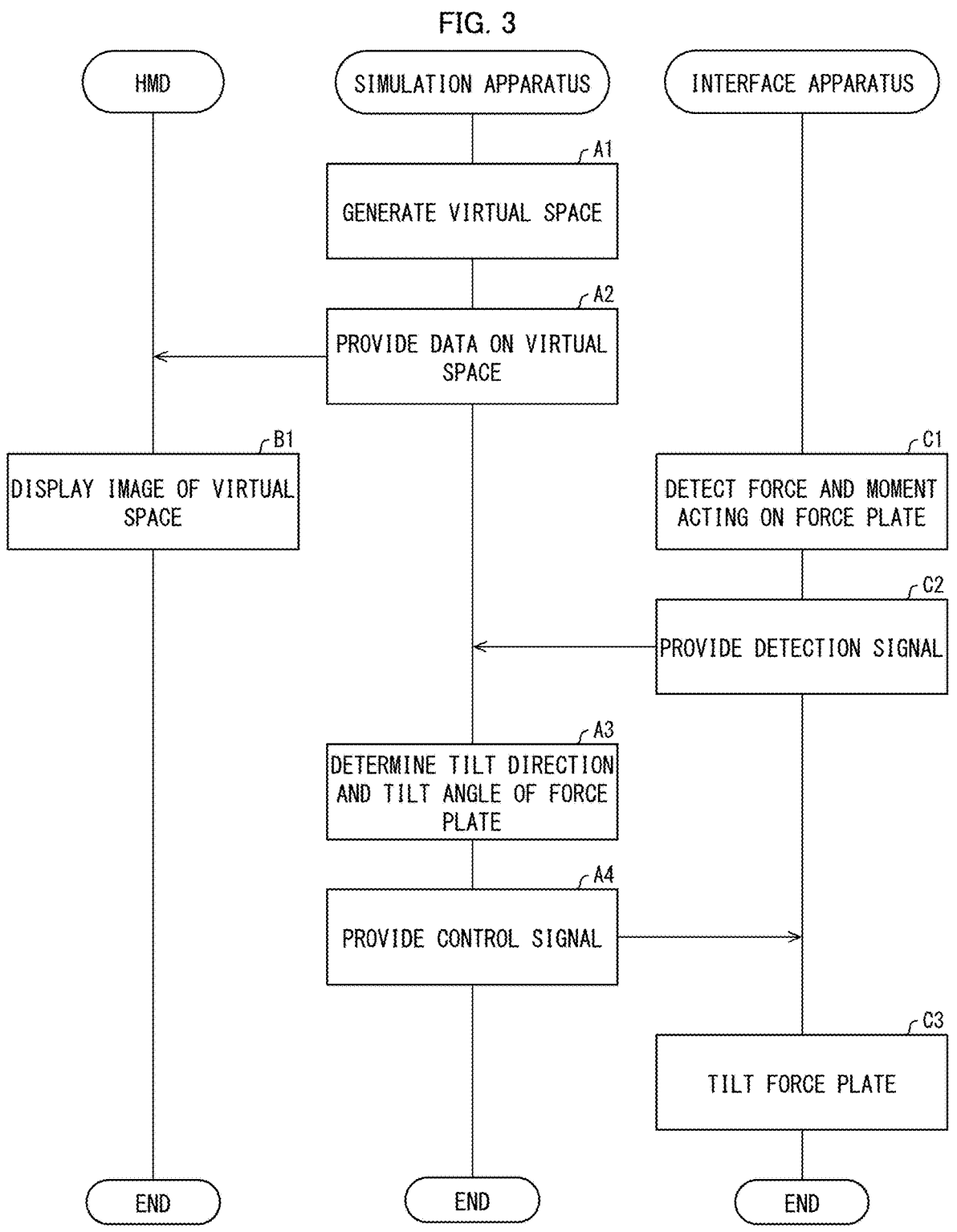
FIG. 3 is a flowchart illustrating a flow of an operation of the system.

When the system S starts its operation, the simulation apparatus 2 first generates a virtual space (step A1) and then provides the data on the virtual space to the HMD 3 worn by the user U (step A2), as illustrated in FIG. 3. The HMD 3 that has received the data on the virtual space displays an image of the virtual space on a display part of the HMD 3 (step B1). Then, the scenery in the virtual space starts moving, and an experience of the board sport starts.

While the HMD 3 displays the virtual space, the interface apparatus 1 repeatedly detects, at a predetermined cycle, a force and a moment which act on the force plate 11 (step C1). Every time the force and the moment are detected, the interface apparatus 1 provides a detection signal to the simulation apparatus 2 (step C2).

The simulation apparatus 2 that has acquired the detection signal repeatedly determines a tilt direction and a tilt angle of the force plate 11 based on a state of the virtual space generated and a posture of the user U which has been specified by the detection signal (step A3). Every time the tilt direction and the tilt angle are determined, the simulation apparatus 2 provides the interface apparatus 1 with a control signal indicating the determined tilt direction and tilt angle (step A4). The interface apparatus 1 that has acquired the control signal then controls the tilt mechanism to tilt the force plate 11 at the tilt direction and the tilt angle indicated by the control signal (step C3).

<Effects of Board Sport Experience System>

A real board sport typically involves motion of a board. Thus, the board oscillates in accordance with change in a state of a road surface or the like as well as oscillates in accordance with, for example, operation by the user U and shifting of a weight of the user U. The interface apparatus 1 described above not only functions as a controller for moving the user U and the board in the virtual space but also can tilt the board in accordance with a state of the virtual space. Thus, the interface apparatus 1 or the system S enables the user U to experience a more realistic movement of a board in a board sport in a virtual space.

Variation

The present invention is not limited to the embodiments, but can be altered by a skilled person in the art within the scope of the claims. That is, the present invention also encompasses, in its technical scope, any embodiment derived by combining technical means disclosed in differing embodiments as appropriate.

For example, the system S may include a cushioning material enclosing the interface apparatus 1. Even in a case where the user U loses a balance on the force plate 11 and falls from the force plate 11, this configuration makes it possible to prevent the user U from being injured due to collision with the floor surface. In addition, this eliminates the need for a handle that the user U is to grip, the handle having been provided in a conventional board-type input apparatus. This makes it possible to make the board sport experience in the virtual space more alike to a setting to experience a real board sport.

Further, the HMD 3 includes a sensor that detects movement of the head of the user U (for example, a gyrosensor) instead of a function of emitting light. In this case, the interface apparatus 1 may not include the photodetectors 13.

Furthermore, the system S may include an air blower which is not illustrated. This air blower is provided in front of the user U so as to blow air toward the user U. The air blower is connected with the simulation apparatus 2 and adjusts a wind velocity in accordance with a velocity at which the user U moves in the virtual space. This causes wind to be blown toward the user U in accordance with movement of the user U and thus makes it possible to further improve reality of the board sport experience in the virtual space.

Further, some or all of the functions of the processor can be achieved also by a logic circuit.

Aspects of the present invention can also be expressed as follows:

An interface apparatus in accordance with Aspect 1 of the present invention is an interface apparatus configured to provide a user with a board sport experience in a virtual space, the interface apparatus including: a board on which the user is to board; a tilt mechanism which supports the board from below such that the board is tiltable; a force sensor that is provided to the board or the tilt mechanism and that detects a force and a moment which are applied from the user to the board; and an input and output section that provides a signal indicative of the force and the moment to a simulation apparatus configured to generate the virtual space and that acquires, from the simulation apparatus, a control signal for controlling the tilt mechanism so as to tilt the board.

An interface apparatus in accordance with Aspect 2 of the present invention may be configured, in Aspect 1, such that the tilt mechanism is a parallel link mechanism.

A board sport experience system in accordance with Aspect 3 of the present invention may include: the interface apparatus in accordance with Aspect 1 or 2; and the simulation apparatus, the simulation apparatus determining a tilt direction of the board and a tilt angle of the board in view of a state of the virtual space and a posture of the user which posture has been specified by the force and the moment.

A board sport experience system in accordance with Aspect 4 of the present invention may be configured, in Aspect 3, to further include a head mounted display which displays an image that represents the virtual space and that has been acquired from the simulation apparatus.

The invention claimed is:

1. An interface apparatus comprising:

a board on which a user is to board;

a tilt mechanism which supports the board from below such that the board is tiltable;

a force sensor that is provided to the board or the tilt mechanism and that detects a force and a moment which are applied from the user to the board; and an input and output section that provides a signal indicative of the force and the moment to a simulation apparatus configured to generate a virtual space and that acquires, from the simulation apparatus, a control signal for controlling the tilt mechanism so as to tilt the board, the tilt mechanism being a parallel link mechanism including a base fixed to a floor surface and a plurality of movable links disposed so as to surround a center part of the base and having respective lower end portions coupled to the base and respective upper end portions coupled to the board, the respective upper end portions and the respective lower end portions of the plurality of movable links included in the parallel link mechanism serving as movable joints, the plurality of movable links being disposed to be tilted so that a pair of movable links located adjacent come closer to each other in an upward direction or come closer to each other in a downward direction, the plurality of movable joints enabling the board to be tilted by expanding and contracting.

2. An interface apparatus comprising:

a board on which a user is to board;

a tilt mechanism which supports the board from below such that the board is tiltable;

a force sensor that is provided to the board or the tilt mechanism and that detects a force and a moment which are applied from the user to the board; and an input and output section that provides a signal indicative of the force and the moment to a simulation apparatus configured to generate a virtual space and that acquires, from the simulation apparatus, a control signal for controlling the tilt mechanism so as to tilt the board, the tilt mechanism being a parallel link mechanism including a base fixed to a floor surface and a plurality of movable links having lower end portions coupled to the base and upper end portions coupled to the board, the plurality of movable links included in the parallel link mechanism enabling the board to be tilted by movement of the lower end portions along an upper surface of the base.

3. A board sport experience system comprising:

the interface apparatus according to claim 1; and the simulation apparatus, the simulation apparatus determining a tilt direction of the board and a tilt angle of the board in view of a state of the virtual space and a posture of the user which posture has been specified by the force and the moment.

4. The board sport experience system according to claim 3, further comprising a head mounted display which displays an image that represents the virtual space and that has been acquired from the simulation apparatus.

5. The board sport experience system according to claim 3, wherein:

a board sport experience to be provided is surfing;

the simulation apparatus generates the virtual space that is designed to resemble a space above ocean; and the simulation apparatus determines a tilt direction of the board and a tilt angle of the board in view of a state of an ocean surface in the virtual space and a posture of the user which posture has been specified by the force and the moment.

\* \* \* \* \*